Feb. 13, 1934.                P. D. HAY                    1,947,413
       APPARATUS FOR FORMING A COVERING OR SLEEVE
         OF PLASTIC MATERIAL UPON A WOODEN PILE
              Filed Aug. 14, 1933      2 Sheets-Sheet 1
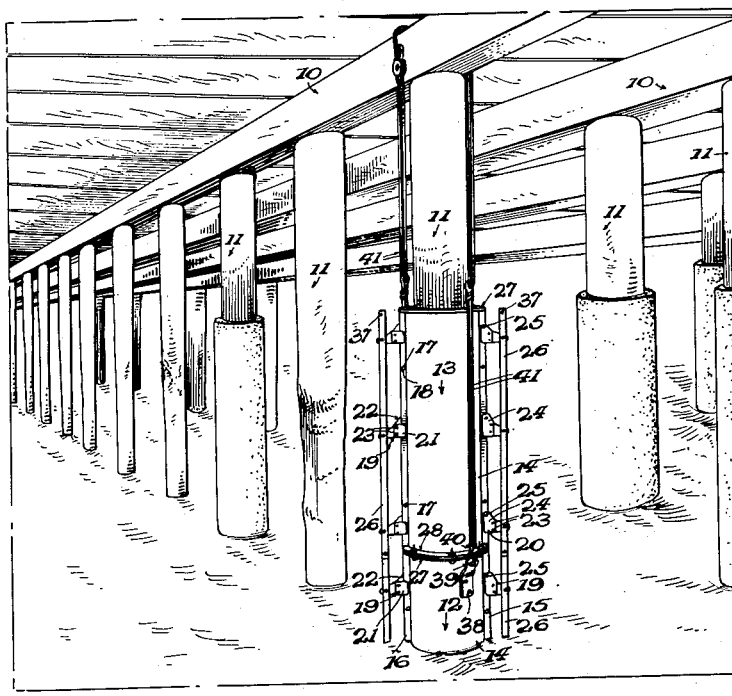
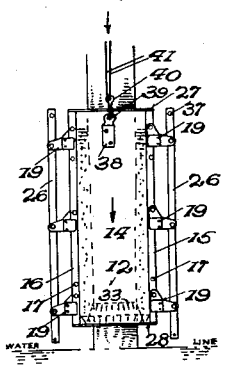
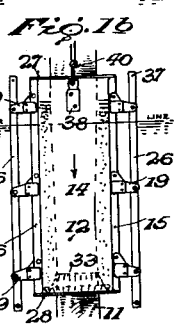
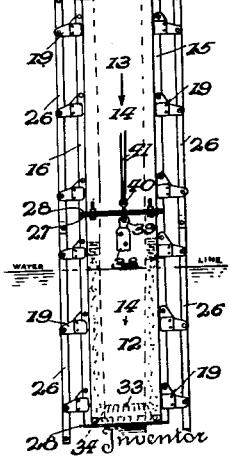
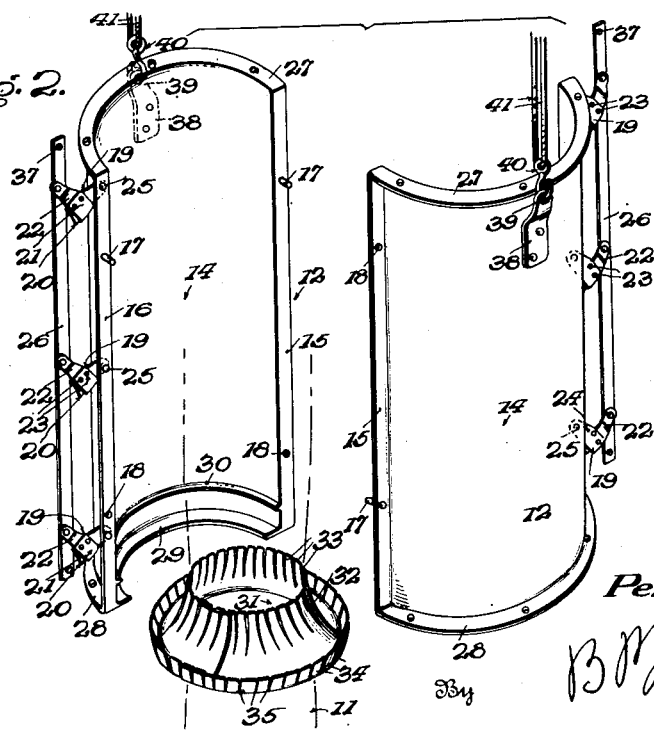
Percy D. Hay Feb. 13, 1934.  P. D. HAY  1,947,413
APPARATUS FOR FORMING A COVERING OR SLEEVE
OF PLASTIC MATERIAL UPON A WOODEN PILE
Filed Aug. 14, 1933   2 Sheets-Sheet 2
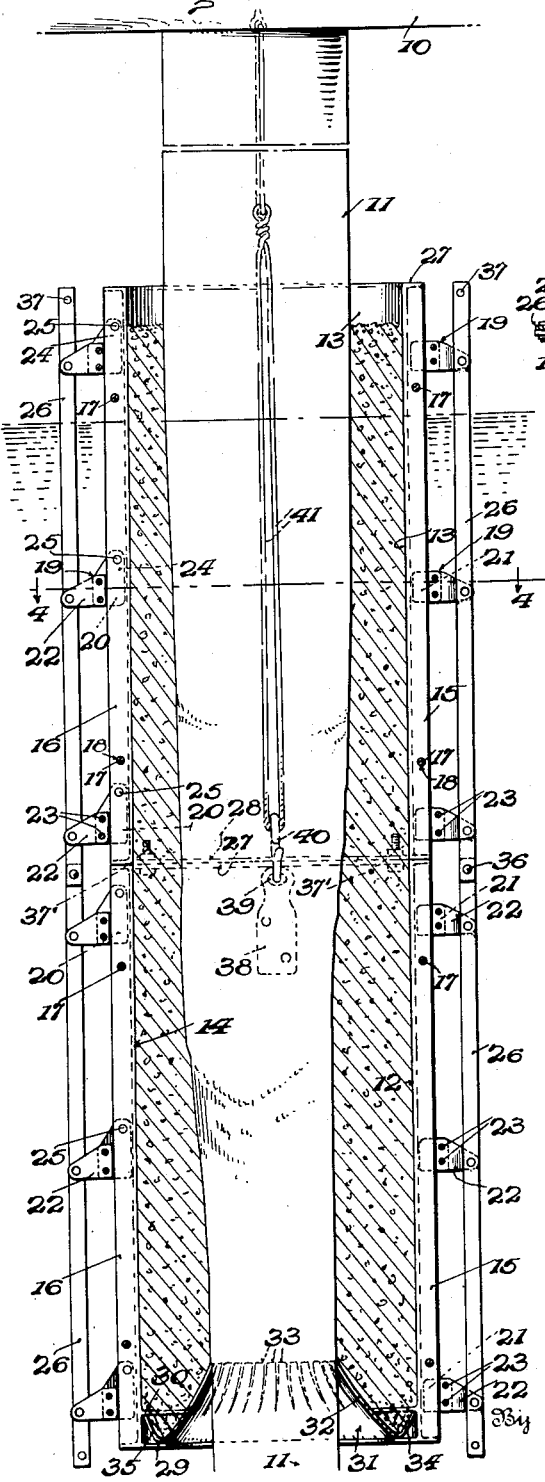
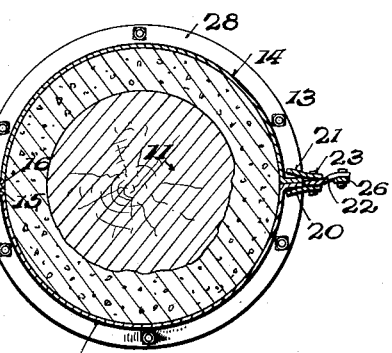
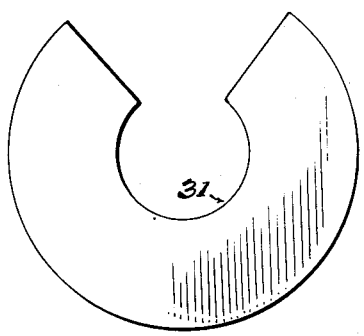
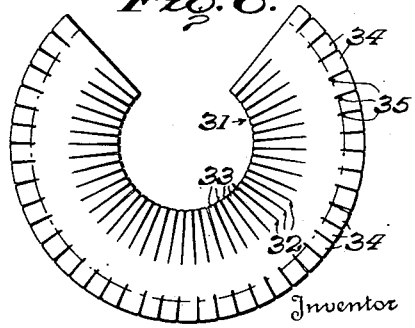
Inventor
Percy D. Hay
Attorney Patented Feb. 13, 1934

1,947,413

UNITED STATES PATENT OFFICE 1,947,413

APPARATUS FOR FORMING A COVERING OR SLEEVE OF PLASTIC MATERIAL UPON A WOODEN PILE

Percy D. Hay, Charleston, S. C., assignor to Coastal Contracting Co. Inc., Charleston, S. C., a corporation of South Carolina Application August 14, 1933. Serial No. 685,107

12 Claims. (Cl. 25—118)

My invention relates to apparatus for forming a covering or sleeve of plastic material upon a wooden pile, to protect the same from the destructive action of animal organisms, present in the water.

An important object of the invention is to provide apparatus of the above mentioned character, so constructed that the plastic material, such as concrete, asphalt, or the like, may be poured into a form at a point above the water level, and the form subsequently lowered to the desired point beneath the water, and then removed from the plastic covering, when the same has set or hardened, thus enabling the apparatus to be used practically indefinitely.

A further object of the invention is to provide apparatus of the above mentioned character, embodying form sections, having means detachably connecting the same, so constructed that such means are reliable in operation and may be properly actuated for disconnecting the form sections, after the plastic material has set or hardened, notwithstanding the high pressure that the plastic material may exert upon the form sections.

A further object of the invention is to provide a bottom member for use in connection with the form, which will properly close the lower end of the form to prevent the escape of the concrete, and being flexible and self-adjusting to the diameter and surface contour of the pile, to closely fit the same.

A further object of the invention is to so construct the bottom member and corelate the same with the form that the downward pressure of the plastic mass within the form will force the inner extremity of the bottom member into proper close engagement with the wooden pile, and the outer extremity of the same into proper close engagement with the form.

A further object of the invention is to provide means whereby the bottom member is properly connected with the form so that it is held against relative longitudinal movement in either direction with relation to the form, as the same is lowered upon the pile, and which is releasable from engagement with the form when the latter is separated from the pile.

A further object of the invention is to provide a flexible bottom member which is extremely simple in construction, and may be manufactured at a low cost.

Other objects and advantages of the invention will be apparent during the course of the following description.

In the accompanying drawings, forming a part of this specification, and in which like numerals are employed to designate like parts throughout the same, Figure 1 is a perspective view of the piles of a wharf, showing my apparatus applied to one pile, completed plastic coverings or sleeves upon certain piles, and other piles as they appear before treatment, the water being below mean low water, Figure 1ª is a side elevation of the apparatus showing the same started above the water line and partly filled with concrete, Figure 1ᵇ is a similar view, showing the form lowered into the water with the level of the concrete maintained above the water line, Figure 1ᶜ is a similar view showing the upper form connected with the lower form, preparatory to the introduction of concrete into the upper form, Figure 2 is a perspective view of the form sections and bottom member, the same being separated for the purpose of illustration, Figure 3 is a central vertical longitudinal section through the plastic covering or sleeve, applied to the pile, the same being taken at the meeting edges of the form sections, Figure 4 is a horizontal section taken on line 4—4 of Figure 3, Figure 5 is a plan view of a blank from which the bottom member is formed, and, Figure 6 is a similar view, showing the blank slit for producing the flexible extremities.

In the drawings, wherein for the purpose of illustration is shown a preferred embodiment of my invention, the numeral 10 designates the caps of the wharf, which are supported by wooden piles 11. As is well known, these wooden piles, at points near the surface of the water, are subjected to the destructive action of animal organisms, present in the water. These animal organisms rarely attack wooden piles at a point substantially above mean high water or substantially below mean low water. It is well known that if a covering or sleeve of plastic material, such as concrete, asphalt or the like, is applied to a wooden pile between these points, that the destructive action of these animal organisms is prevented. The present apparatus is designed to apply this covering or sleeve of plastic material to the wooden pile.

The apparatus embodies any suitable number of forms, designated as a whole by the numerals 12 and 13. While I have shown two of these forms arranged in end-to-end relation, yet any suitable number may be employed, as may be found advantageous.

The lower form 12 is divided longitudinally into companion form sections 14, which may be made of sheet metal or any other suitable material. These form sections are preferably semi-cylindrical, and are provided at their inner or meeting longitudinal edges with flanges 15 and 16. The flanges 15 and 16 of one form section are provided with horizontal dowels or pins 17, rigidly attached thereto, and arranged to enter apertures 18 formed in the flanges 15 and 16 of the companion form section 14, when the form sections are assembled in the closed position. These pins and openings serve to hold the form sections together against relative longitudinal movement, and also against lateral movement in the plane of the flanges, and also serve to indicate when the form sections are properly assembled in the closed position.

Means are provided to detachably connect or lock the flange 16 of one form section 14 with the correspondingly arranged flange 15 of the companion form section 14. These means comprise a plurality of forked latch elements 19, arranged in spaced relation along each flange 16 of each form section. Each latch element embodies opposed jaws 20 and 21, the outer edges of which are disposed upon opposite sides of an arm or crank 22, and are rigidly attached thereto by rivets 23, or any other suitable means. The jaw 21 has an extension 24, and this extension is pivotally connected with the flange 16 by a rivet 25, or other suitable pivot. Particular attention is called to the fact that these jaws 20 and 21 diverge inwardly toward the casing sections 14, whereby they produce a wedging action against the assembled flanges 15 and 16, when the latch element is swung inwardly toward the same. This wedging action serves to draw the flanges in close relation and retain the same in this relation, and also permits of the positive separation of these flanges 15 and 16, when the latch elements are shifted outwardly to the releasing position. The several latch elements constituting each set are pivotally connected with a shifting element 26, which may be in the form of a strap or bar.

At their tops or upper ends, the form sections 14 are provided with curved outwardly projecting horizontal flanges 27, which serve to reinforce and stiffen the form sections, and also provide means for connecting these form sections with the adjacent upper form sections, as will be described. At their lower ends or bottoms, the form sections 14 are provided with curved horizontal outwardly projecting flanges 28, which serve to stiffen and reinforce the form sections, and also as a means for the attachment or support of stop elements, or flanges 29. The flanges 29 are arranged beneath the flanges 28, and extend outwardly beyond the form sections 14 to the outer edges of the flanges 28, and also extend inwardly beyond the form sections 14 for affording horizontal stops or supports for a bottom member, to be described. The flanges 29 are secured to the flanges 28 by bolts or the like. Each form section 14 is provided at a point near and spaced from the flange 29 with a horizontally arranged stop element or flange 30, projecting inwardly, as shown.

The numeral 31 designates a bottom member, which is flexible, the same being preferably formed of sheet metal. This bottom member is bodily circumferentially adjustable since it is in the form of a split ring, with overlapping ends. The bottom member is generally conical, decreasing in diameter upwardly, and having its upper extremity rendered flexible by slitting the same along lines 32, affording flexible tongues 33. At its lower extremity, the bottom member embodies resilient tongues 34, formed by slitting the material along lines 35. These tongues are bent outwardly and upwardly and produce an annular group. The inner or upper tongues 32 are inclined inwardly, while the lower tongues 34 are inclined outwardly. The annular set of tongues 34 are adapted for insertion within the annular socket or locking means afforded by the flanges 29 and 30 of the form sections, and these locking means serve to prevent the bottom member from moving longitudinally with relation to the form sections, when the form sections are moved longitudinally or lowered upon the pile. This is an important feature of the invention.

In Figure 5, I have shown a blank of flexible sheet metal from which the bottom member is formed, the same being generally segmental in shape. In Figure 6, the upper and lower edges of this blank are shown as slit at spaced intervals for producing the upper and lower sets of resilient or flexible tongues. After this slitting action, the blank is bent into the annular shape to produce the complete bottom member, and the lower set of tongues are bent outwardly and upwardly, as shown in Figure 2.

The form 12 and associated elements, as described, may be used alone, and when so desired, it would be made of any suitable length. However, it is preferred to divide the apparatus up into a plurality of lengths, on account of the lack of head room beneath the wharf or structure where such apparatus is ordinarily used. I have illustrated the apparatus as embodying two forms 12 and 13, arranged in end-to-end relation. The upper form 13 is identical with the lower form 12, except as now indicated. The upper form 12 omits the inwardly projecting flanges 29 and the inner flanges 30, since the bottom member 31 is not arranged within the lower end of the upper form 13. The lower flanges 28, carried by the sections of the upper form 13, are apertured, as is also the case with the upper flanges 27 of the form sections of the lower form 12. This is done so that the sections of the forms 12 and 13 may be bolted together at their adjacent ends. The same flanges 15 and 16, at the edges of the sections 14 of the form 13 are employed, and the same latch elements 19 are used to detachably lock these flanges together. The shifting elements or bars 26 of the upper form 13 have their lower ends apertured for receiving bolts 36, which are adapted to pass through apertures 37 in the upper ends of the shifting elements 26 of the lower form.

Attached to each section 14 of the lower form 12, preferably near its upper end, is a lug 38, having an aperture 39 formed therein for receiving a hook 40, carried by a cable or other flexible suspension element. It is thus seen that means are provided for supporting the lower form 12, and for properly lowering the same, when desired.

The operation of the apparatus is as follows:

In the beginning of the operation, the upper form 13 is not applied to the lower form 13. The sections 14 of the lower form are now supported by the cables 41, which are suitably connected with the cap 10. Since the lugs 38 are near the upper ends of these sections 14, and are offset outwardly with relation thereto, the form sections 14, when in the supported position, tilt longitudinally, with their lower ends diverging, it being understood that these two form sections are now positioned upon opposite sides of the pile to be treated, but are considerably spaced from the same. The operator now takes the split resilient bottom member 31, and opens the split end of the same and applies the same to the pile so that it surrounds the pile like a ring, with its free ends overlapping. The operator now adjusts this bottom member so that it will fit closely upon the pile, and moves the same up or down upon the pile, as the case may be, until the lower set of tongues 34 are brought into substantial alignment with the spaces between the flanges 29 and 30 of the two sections 14. The operator now swings one section 14 inwardly toward the pile so that the tongues 34 enter the space between the flanges 29 and 30, and after this, the companion section 14 is swung inwardly, so that the tongues 34 enter the space between its flanges 29 and 30, and the pins 17 enter the apertures 18 in the flanges 15 and 16. The latch elements 19 are now moved downwardly and inwardly for locking the flanges 15 and 16 together, and the two form sections constitute, in effect, a single preferably cylindrical form. When thus assembled, the form is supported above the water for a slight distance, ordinarily from six to eight inches, Figure 1ª. The concrete which has been previously mixed, when concrete is employed, as the plastic material, is now poured into the upper end of the form, until the form is partly or wholly filled with the concrete mass, as may be desired. When the form is thus partly or wholly filled with the concrete mass, the downward pressure of the concrete mass acts upon the upper tongues 33 to flex and force them inwardly in close contact or engagement with the wooden pile, while the concrete mass also exerts downward pressure upon the lower tongues 34 to force them outwardly into firm engagement with the inner walls of the sections 14.

While the form 12 is thus partly or wholly filled with the concrete mass, such form is now lowered into the water and is again supported at such an elevation that the top of the concrete mass is about six inches above the water level, Figure 1ᵇ. The upper form 13 is now placed about the pile above the lower form 12, and the form sections of these two forms are rigidly connected by bolts 37', and the bars 26 are connected, as explained. The concrete is now poured into the upper end of the form 13, completely filling the lower form 12, if it was not previously filled, and partly or wholly filling the upper form 13, as may be desired. This having been accomplished, both forms are again lowered until the top of the concrete mass in the upper form 13 is about six inches above the water level, at which time the forms are again supported at this elevation. Additional form or forms similar to the form 13, may be arranged above this form 13, and connected therewith, if desired, depending upon the depth that the concrete coating or sleeve is to be formed upon the pile. After the final lowering of the forms 12 and 13, they are held supported at this elevation until the concrete mass has sufficiently set to allow removal of the forms. At the end of this time, the operator swings the latch elements 19 upwardly and outwardly, which may be accomplished by hammering upon one of the latch elements, shifting it upwardly, and moving all of the latch elements, in the corresponding sets upwardly, since they are connected. The latch elements on both sides of the two sets of form sections 14 being thus moved to the outer or releasing position, the sections 14 readily separate from each other and form the hardened or set concrete covering or sleeve.

The sections 14 may now be shifted laterally so that they separate from the bottom member 31, which remains permanently attached to the concrete covering or sleeve. The sections 14 may now be raised from the water so that they may be again used.

During the downward movement of the form 12, upon the wooden pile, the flexible tongues 32 being pressed inwardly by the concrete, readily conform to the diameter and surface contour of the pile, at all times affording a joint which is sufficiently tight to prevent of the discharge or escape of the concrete. When the form is lowered into the water after being filled with the concrete, the form and joints afforded by the bottom member 31, are sufficiently tight to prevent of the escape of the concrete or washing away of the same by the water.

While I have described the operation of the apparatus, by using a concrete mass, yet the invention is not necessarily restricted to the same. The apparatus may be used in connection with other plastic material, such as asphalt or the like.

It is to be understood that the form of my invention herewith shown and described is to be taken as a preferred example of the same, and that various changes in the shape, size and arrangement of parts may be resorted to without departing from the spirit of my invention, or the scope of the subjoined claims.

Having fully described my invention, what I claim as new is:—

1. Apparatus for forming a covering or sleeve of plastic material upon a wooden pile, comprising a form divided longitudinally into form sections which are adapted to surround the pile, means for detachably connecting the form sections, a bottom member for surrounding the pile and having detachable connections with the form sections, the arrangement being such that the bottom member is held by the form sections against longitudinal movement with relation thereto and freed from the connections with the form sections when such form sections are shifted laterally from the bottom member.

2. Apparatus for forming a covering or sleeve of plastic material upon a wooden pile, comprising a form divided longitudinally into form sections which are adapted to surround the pile, means for detachably connecting the form sections, a bottom member for surrounding the pile, and means for forming a generally horizontal holding device near the lower end of each form section, said holding devices receiving a portion of the bottom member, the arrangement being such that the bottom member cannot move longitudinally of the form sections when held within the holding devices and the form sections may be shifted laterally from the bottom member for separation therefrom, and means for supporting the form sections while they are being placed in position upon the pile.

3. Apparatus for forming a covering or sleeve of plastic material upon a wooden pile, comprising a form divided longitudinally into form sections which are adapted to surround the pile, means for detachably connecting the form sections, a flexible bottom member for surrounding the pile and being split transversely for affording free ends, and means for forming generally horizontal channels upon the inner side of each form section near its lower end, the channels being adapted for receiving portions of the bottom member.

4. Apparatus for forming a covering or sleeve of plastic material upon a wooden pile, comprising a form divided longitudinally into form sections which are adapted to surround the pile, means for detachably connecting the form sections, a circumferentially adjustable upwardly tapering bottom member adapted to surround the pile, said bottom member having an upper inwardly converging flexible portion and a lower outwardly diverging flexible portion, means for forming a generally horizontal channel upon the inner side of each form section near its lower end, the channels being adapted to receive the lower flexible portion of the bottom member, the arrangement of the upper and lower flexible portions of the bottom member being such that the downward pressure of the plastic material within the form sections serves to force the upper flexible portion toward the pile and the lower flexible portion toward the form sections.

5. Apparatus for forming a covering or sleeve of plastic material upon a wooden pile, comprising a form divided longitudinally into form sections which are adapted to surround the pile, means for detachably connecting the form sections, a flexible bottom member to surround the pile, a generally horizontal flange secured to each form section near its lower end and projecting inwardly beyond the inner surface of the form section, a second generally horizontal flange secured to each form section near and above the first named flange and spaced therefrom and projecting inwardly beyond the inner surface of the form section, the bottom member having a portion adapted for insertion within the spaces between the first and second named flanges, such flanges serving to hold the bottom member against longitudinal movement in either direction with relation to the form sections.

6. Apparatus for forming a covering or sleeve of plastic material upon a wooden pile, comprising a form divided longitudinally into form sections which are adapted to surround the pile, means for detachably connecting the form sections, a one-piece split bottom member for surrounding the pile, means for effecting a detachable interlocking engagement between the bottom member and the form sections so that the bottom member is held against longitudinal movement with relation to the form sections and the form sections may be separated from the bottom member by lateral movement from the same, and means for supporting the form when in place upon the pile.

7. Apparatus for forming a covering or sleeve of plastic material upon a wooden pile, comprising a form divided longitudinally into form sections which are adapted to surround the pile, the form sections being provided at their meeting edges with longitudinally extending flanges, pivoted latch elements arranged adjacent to the sets of flanges and adapted when swung to the closed position to engage the flanges and have a wedging action therewith to force them together, a bottom member for surrounding the pile, and means for detachably connecting the bottom member with the form sections, such means locking the bottom member against longitudinal movement in either direction with relation to the form sections and permitting of the separation of the form sections from the bottom member when the form sections are shifted outwardly therefrom.

8. Apparatus for forming a covering or sleeve of plastic material upon a wooden pile, comprising a form divided longitudinally into form sections which are adapted to surround the pile, the form sections being provided at their meeting edges with longitudinally extending flanges, pivoted forked latch elements arranged adjacent to the longitudinal flanges of each set and adapted when swung to the closed position to exert a wedging action upon such flanges and draw them together, means for connecting the pivoted latch element in each set, and a bottom member for surrounding the pile and having detachable connection with the form sections.

9. Apparatus for forming a covering or sleeve of plastic material upon a wooden pile, comprising a form divided longitudinally into form sections which are adapted to surround the pile, means for detachably connecting the form sections, a bottom member adapted to surround the pile, means for detachably connecting the bottom member with the form sections and serving to positively hold the bottom member against longitudinal movement in either direction with relation to the bottom member and to permit of the separation of the form sections from the bottom member when the form sections are shifted laterally from the same, a second form arranged above the first named form and divided longitudinally into form sections, means for connecting the corresponding form sections of the upper and lower forms, means for detachably connecting the form sections of the upper form, the last named means having connection with the corresponding detachable connecting means of the lower form, and means for supporting the lower form.

10. In apparatus for forming a covering or sleeve of plastic material upon a wooden pile, as a sub-combination, a one-piece split flexible bottom member for surrounding the pile, said bottom member tapering upwardly, said bottom member being provided at its upper portion with flexible tongues which converge upwardly, said bottom member being provided near its bottom with flexible tongues which are inclined outwardly in an upwardly direction.

11. In apparatus for forming a covering or sleeve of plastic material upon a wooden pile or the like, as a sub-combination, a flexible bottom member for surrounding the pile, said bottom member tapering upwardly, said bottom member being provided at its upper portion with flexible tongues which converge upwardly, said bottom member being provided near its bottom with flexible tongues which are inclined outwardly in an upwardly direction.

12. In apparatus for forming a covering or sleeve of plastic material upon a wooden pile or the like, comprising a form divided longitudinally into form sections which are adapted to surround the pile, means for detachably connecting the form sections, a bottom member for surrounding the pile, said bottom member tapering upwardly, said bottom member being provided at its upper portion with flexible tongues which converge upwardly, means for forming a generally horizontal holding device near the lower end of each form section, said holding devices receiving the lower portion of the bottom member, the arrangement being such that the bottom member cannot move longitudinally of the form sections when held within the holding devices and the form sections may be shifted laterally from the bottom member for separation therefrom, and means for supporting the form sections while they are being placed in position upon the pile.

PERCY D. HAY.